June 20, 1950　　　　　　　L. MANNON　　　　　　2,512,030
FILM CONTROLLED AUTOMATIC SAFETY SHUTTER
FOR MOVING PICTURE PROJECTORS
Filed Feb. 25, 1946　　　　　　　　　　　　　2 Sheets-Sheet 2

INVENTOR.
LLOYD MANNON.
BY
Munn, Liddy & Glaccum
ATTORNEYS.

Patented June 20, 1950

2,512,030

UNITED STATES PATENT OFFICE 2,512,030

FILM CONTROLLED AUTOMATIC SAFETY SHUTTER FOR MOVING PICTURE PROJECTORS

Lloyd Mannon, San Francisco, Calif.

Application February 25, 1946, Serial No. 650,008

6 Claims. (Cl. 88—17)

An object of my invention is to provide a film controlled automatic safety shutter for a moving picture projector that will prevent the film from catching fire should it break or pass too slowly through the path of light.

A further object of my invention is to provide a device of the type described in which the safety shutter is opened, held in open position, and closed by the mechanical force created by the moving film passing through the projector. The safety shutter operates independently of the mechanism in the projector and is dependent on the safe passage of the film through the projector. The shutter will open only when the film is moving through the projector at a predetermined speed and in a safe manner.

The invention may be used for other purposes than to control a moving picture projector fire shutter, such as for example the operation of a switch in the motor circuit that drives the projector. The invention can also be used in a motion picture camera to open the lens aperture when the film is moving at the proper speed and to close the lens aperture when the film movement drops below this speed. The invention may operate a switch in the motor circuit rather than open the lens aperture if desired.

Other objects and advantages will appear in the following specification, and the novel features of the device will be particularly pointed out in the appended claims.

My invention is illustrated in the accompanying drawings forming a part of this application, in which:

Figure 3 is a perspective view of the clutch used with the governor;

Figure 4 is a perspective view of the flyweights and associate mechanism forming a part of the governor;

While I have shown only the preferred forms of my invention, it should be understood that various changes or modifications may be made within the scope of the appended claims without departing from the spirit and scope of the invention.

Figure 1:
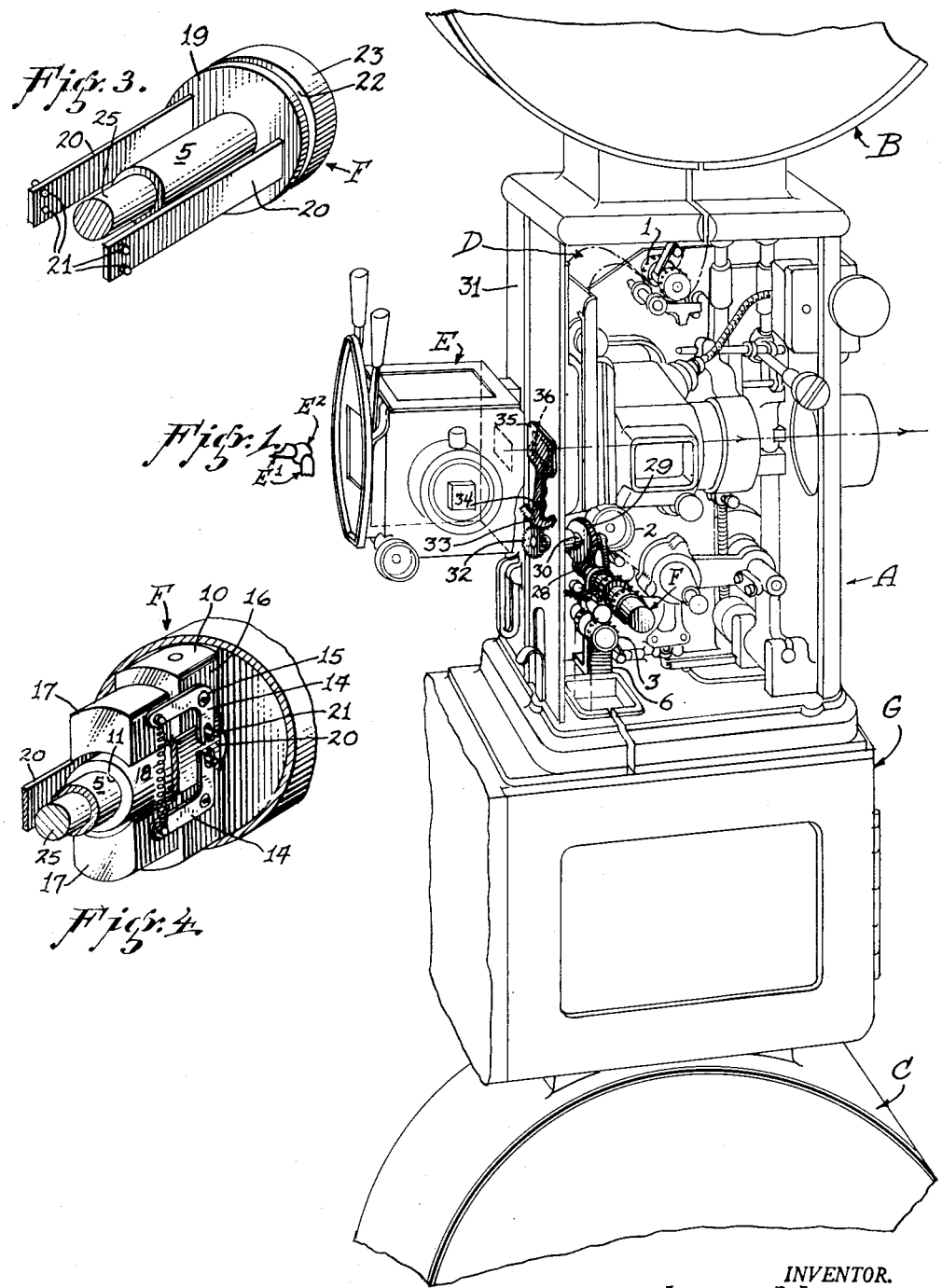
Figure 1 is a perspective view of a moving picture projector showing my device operatively applied thereto.

In carrying out my invention, I make use of a moving picture propector as indicated generally at A in Figure 1. The projector has a film feeding magazine B and a film take-up magazine C. A film D is fed from the upper magazine B, around an upper feed sprocket 1, and the film is then passed in front of a shutter mechanism indicated generally at E, and past an intermittent sprocket 2. The film then passes to the spool and governor indicated at F which is my invention and then around an idler to a hold-back sprocket 3. From the sprocket 3, the film moves on into the sound reproducing head G and then into the lower magazine C. Electrodes E1 are shown in Figure 1 for producing an arc light E2. The parts thus far described with the exception of the combination spool and governor F, form no part of my invention except insofar as they cooperate with the parts now to be described.

Figure 2:
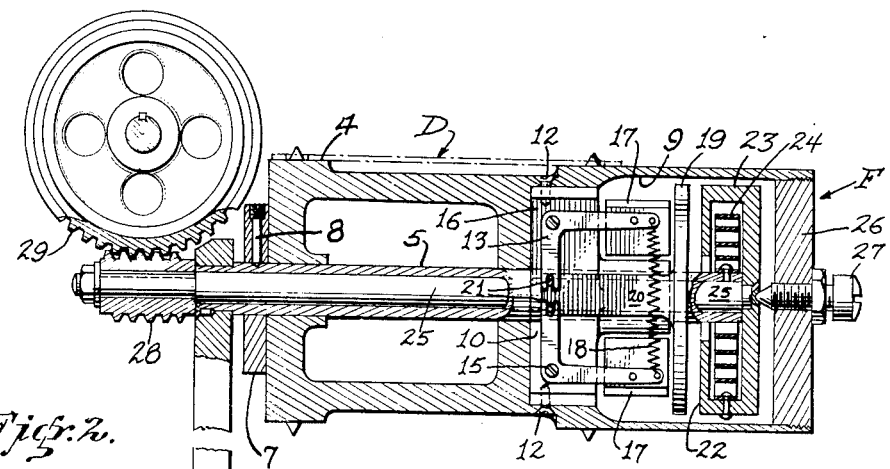
Figure 2 is a longitudinal section through the governor, portions being shown in elevation.

I will now describe the construction of the combined film spool and governor F. In Figure 2, the film spool is shown at 4 and it is rotatably mounted on a hollow shaft 5. The shaft in turn is rigidly mounted in a support 6. The spool is held against longitudinal movement to the left in Figure 2 by a disc 7 that is secured to the shaft 5 by a set screw 8. The spool 4 has an extension at one end that has a recess 9 for receiving a part of the governor mechanism.

A base 10 with a cylindrical bore 11 is slipped over the shaft 5 and is secured to the spool 4 by set screws 12. Figures 2 and 4 illustrate how the base 10 pivotally carries two pairs of bell crank levers 13 and 14. The pairs of levers are pivoted at 15 to parallel flat faces 16 on the base and carry flyweights 17. Coil springs 18 yieldingly urge the weights toward each other.

Figures 2 and 3 show a friction disc 19 sliding on the hollow shaft 5 and carrying longitudinally extending fingers 20. The bell crank levers 13 and 14 have forked ends engaging with pins 21 that are carried by the fingers. When the weights fly apart due to centrifugal force, the friction disc will be forced against the friction face 22 of a casing 23. A torsional spring 24 is mounted in the casing and has one end secured to the shaft 5. The casing is secured to a shaft 25 that is rotatably mounted in the hollow shaft 5. The end of the compartment or recess 9 is closed by a cover plate 26 and a set screw 27, carried by the plate 26 bears against the end of the shaft 25.

The shaft 25 carries a worm 28 that meshes with a worm gear 29. Referring to Figure 1, it will be seen that the worm gear 29 is mounted on a shaft 30 and that the shaft is rotatably mounted in the casing wall 31. A pinion 32 is mounted on the shaft and meshes with a quadrant 33. The quadrant is pivoted at 34 and carries a fire shutter that is designed to cover a light opening 36. When the film is moving at the proper speed, the weights 17 overcome the springs 18 and fly out, causing the bell cranks 13 and 14 to force the friction clutch 19 against the face 22. This will rotate the casing 23 until the spring 24 is wound up to a sufficient tension to hold the casing against further rotation while permitting the clutch plate 19 to slip over the clutch face 22. The rotation of the casing 23, however, is sufficient to rotate the shaft 25 through a desired number of revolutions for causing the worm 28, worm gear 29, pinion 32 and quadrant 33 to swing the fire shutter for uncovering the opening 36. As soon as the film speed decreases below a predetermined point, or should the film break, the weights 17 will loose centrifugal force, and the pressure holding the clutch 19 against the face 22 will be removed and the spring 24 will instantly return the casing 23 to its starting position and will cause the fire shutter to immediately cover the opening 36 and prevent the heat from the light rays from setting fire to the film.

Figures 5, 7:
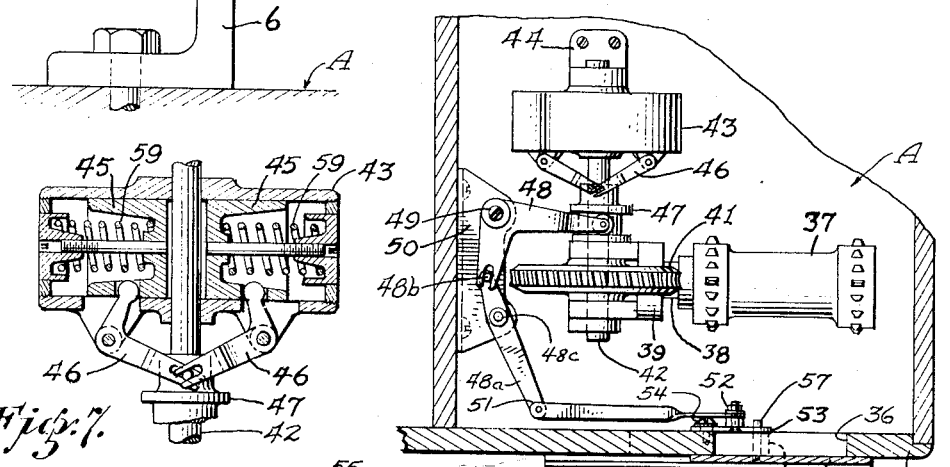
Figure 5 is a horizontal section of a modified form of governor control, and is taken along the line V—V of Figure 6.
Figure 7 is a transverse section through the governor used with the modified form illustrated in Figures 5 and 6.
Figure 6:
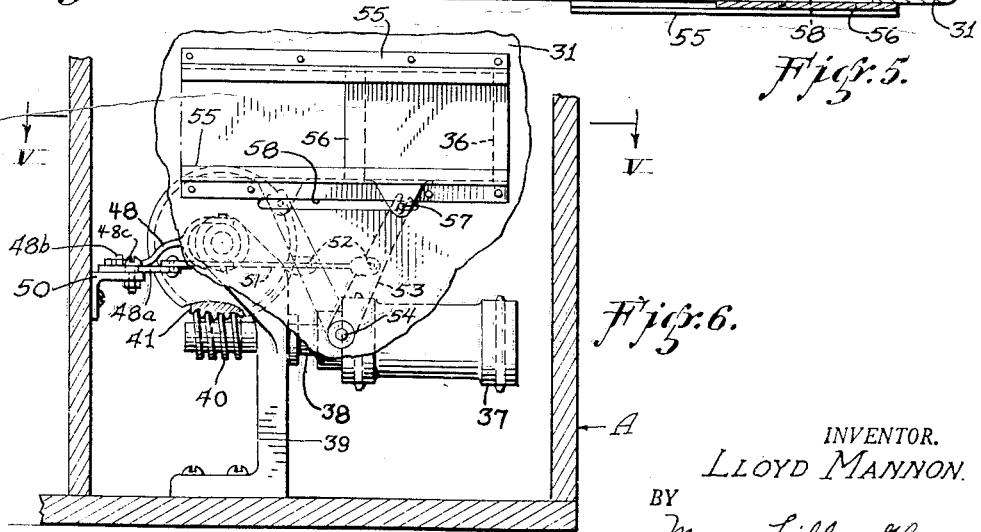
Figure 6 is a front elevation of Figure 5 with the front casing wall broken away to show the shutter actuating parts.

In Figures 5, 6 and 7, I show a modified form of the invention for accomplishing the same purpose. A film spool 37 takes the place of the spool 4 and the spool is mounted on a shaft 38 that is rotatably mounted in a support 39. A worm 40 is mounted on the shaft 38 and rotates a worm gear 41. The support 39 rotatably carries a shaft 42 on which the worm gear 41 is mounted.

Figures 5 and 7 show a governor casing 43 rotated by the shaft 42 and a bracket 44 rotatably supports the end of the shaft 42. Spring-pressed piston-weights 45 are mounted in the casing 43 and are moved radially outwardly by centrifugal force when the casing 43 is rotated. Bell-crank levers 46 are actuated by the outwardly moving weights and lift a collar 47 that is slidably mounted on the shaft 42.

A bell-crank lever 48 is pivoted at 49 to a bracket 50 and has one end acted upon by the movement of the collar 47 along its supporting shaft. The other end of the bell-crank lever 48 has a lever 48a connected thereto by a pin 48b. The lever 48a is pivoted at 48c and has a link 51 connected thereto, the opposite end of the link being pivotally connected at 52 to an arm 53. Figures 5 and 6 show the arm pivotally mounted at 54 to the casing wall 31 that has the opening 36 therein.

The opening 36 is provided with horizontally disposed guide channels 55 in which a fire shutter 56 is slidably mounted. The arm 53 has a forked end that receives a pin 57 that slides in a slot 58 provided in the casing wall 31. The pin is carried by a projection that depends from the fire shutter 56. When the film D passes over the spool 37 at a sufficient speed, the governor 43 will cause the collar 47 to move the bell-crank lever 48 to open the fire shutter 56. Any failure upon the part of the film to maintain the proper speed for safety or should the film break, the spool 37 will slow down in its rotation or will stop and in either event the springs 59 will force the weights 45 back and the bell-cranks 46 will cause the collar 47 to immediately move the fire shutter and close the opening 36. This will prevent the heat from the carbon light setting fire to the film.

Although I have shown the shutter 56 disposed on the outer surface of the casing wall 31, it is obvious that it can be mounted on the inside of the casing. The same is true of the fire shutter 35. This shutter may be mounted within the casing and thus protect the pinion 31 and the quadrant 33. The springs 59 are used to overcome the centrifugal force of the weights 45 and determine the speed of the film at which the fire shutter operates. A switch, not shown, may be operated when the fire shutter is closed, to open the motor circuit.

I claim:

1. In combination, a rotatable member, a hollow shaft for rotatably supporting the member, said member having a cavity therein, a combined governor and clutch mounted in the cavity and including weights, bell-crank levers pivotally supporting the weights, spring means for urging the weights toward each other, a torsional spring housing rotatable about the same axis as the hollow shaft and constituting one element of a clutch, a clutch plate rotatable with the member and movable by the levers against the clutch face of the housing when the weights fly outwardly due to centrifugal force generated by the rotation of the member, whereby the housing will be rotated, a torsional spring mounted in the housing and having one end secured thereto and the other end secured to the hollow shaft, and a second shaft mounted in the hollow shaft and being rotated by the housing during the winding of the torsional spring, said second shaft ceasing to rotate when the force exerted by the torsional spring balances the force of the clutch plate against the housing.

2. In combination, a rotatable member, a hollow shaft for rotatably supporting the member, said member having a cavity therein, a combined governor and clutch mounted in the cavity and including weights, bell-crank levers pivotally supporting the weights, spring means for urging the weights toward each other, a torsional spring housing rotatable about the same axis as the hollow shaft and constituting one element of a clutch, a clutch plate rotatable with the member and movable by the levers against the clutch face of the housing when the weights fly outwardly due to centrifugal force generated by the rotation of the member, whereby the housing will be rotated, a torsional spring mounted in the housing and having one end secured thereto and the other end secured to the hollow shaft and a second shaft mounted in the hollow shaft and being rotated by the housing during the winding of the torsional spring, said second shaft ceasing to rotate when the force exerted by the torsional spring balances the force of the clutch plate against the housing, a shutter normally closing an opening, and means actuated by the second shaft when rotated by the housing during the winding up of the torsional spring for removing the shutter from the opening, said last-named means again moving the shutter over the opening when the rotatable member stops or slows down below a predetermined speed.

3. In combination, a rotatable member, a hollow shaft for rotatably supporting the member, a combined governor and clutch and including weights and two clutch plates, spring means for urging the weights toward each other, one of the clutch plates being rotatable with the member and moveable by the governor against the other clutch plate when the weights fly outwardly due to centrifugal force generated by the rotation of the member, whereby the said other clutch plate will be rotated, a torsional spring having one end secured to the said other clutch plate and the other end secured to the hollow shaft, and a second shaft mounted in the hollow shaft and rotated by the said other clutch plate during the winding of the torsional spring, the second shaft ceasing to rotate when the force exerted by the torsional spring balances the force of the clutch plate connected to the governor.

4. In combination, a rotatable member, a hollow shaft for rotatably supporting the member, a combined governor and clutch and including weights and two clutch plates, spring means for urging the weights toward each other, one of the clutch plates being rotatable with the member and moveable by the governor against the other clutch plate when the weights fly outwardly due to centrifugal force generated by the rotation of the member, whereby the said other clutch plate will be rotated, a torsional spring having one end secured to the said other clutch plate and the other end secured to the hollow shaft, and a second shaft mounted in the hollow shaft and rotated by the said other clutch plate during the winding of the torsional spring, the second shaft ceasing to rotate when the force exerted by the torsional spring balances the force of the clutch plate connected to the governor, a shutter normally closing an opening, and means actuated by the rotation of the second shaft during the winding up of the torsional spring for removing the shutter from the opening, said last-named means again moving the shutter over the opening when the rotatable member stops or slows down below a predetermined speed.

5. In combination, a rotatable member, a shaft for rotatably supporting the member, a combined governor and clutch and including weights and two clutch plates, spring means for urging the weights toward each other, one of the clutch plates being rotatable with the member and moveable by the governor against the other clutch plate when the weights fly outwardly due to centrifugal force generated by the rotation of the member, whereby the said other clutch plate will be rotated, a second spring means for yieldingly holding the said other clutch plate in a predetermined position with respect to said rotatable member, and a second shaft rotated by the said other clutch plate during the storing of energy in the second spring means, the second shaft ceasing to rotate when the force exerted by the stored up energy in the second spring means balances the force of the clutch plate connected to the governor.

6. In combination, a rotatable member, a shaft for rotatably supporting the member, a combined governor and clutch and including weights and two clutch plates, spring means for urging the weights toward each other, one of the clutch plates being rotatable with the member and moveable by the governor against the other clutch plate when the weights fly outwardly due to centrifugal force generated by the rotation of the member, whereby the said other clutch plate will be rotated, a second spring means for yieldingly holding the said other clutch plate in a predetermined position with respect to said rotatable member, a second shaft rotated by the said other clutch plate during the storing of energy in the second spring means, the second shaft ceasing to rotate when the force exerted by the stored up energy in the second spring means balances the force of the clutch plate connected to the governor, a shutter normally closing an opening, and means actuated by the rotation of the second shaft during the storing of energy in the second spring means for removing the shutter from the opening, said last-named means moving the shutter over the opening when the rotatable member stops or slows down below a predetermined speed.

LLOYD MANNON.

REFERENCES CITED

The following references are of record in the file of this patent:

UNITED STATES PATENTS

| Number | Name | Date |
| --- | --- | --- |
| 1,022,320 | Kershaw | Apr. 2, 1912 |
| 1,417,595 | Daniels | May 30, 1922 |
| 1,537,830 | Kiral | May 12, 1925 |
| 1,628,258 | Malm | May 10, 1927 |
| 2,009,532 | Taylor | July 30, 1935 |
| 2,280,825 | Holman | Apr. 28, 1942 |

FOREIGN PATENTS

| Number | Country | Date |
| --- | --- | --- |
| 455,280 | France | May 20, 1913 |
| 381,241 | Germany | Sept. 18, 1923 |